(12) United States Patent
Manin (10) Patent No.: US 9,297,920 B2
(45) Date of Patent: Mar. 29, 2016

(54) ENHANCED METHOD AND DEVICE FOR AQUATIC SEISMIC PROSPECTING

(75) Inventor: Michel Manin, Sainte-Mesme (FR)

(73) Assignee: KIETTA, Paris (FR)

( * ) Notice: Subject to any disclaimer, the term of this patent is extended or adjusted under 35 U.S.C. 154(b) by 822 days.

(21) Appl. No.: 13/143,010

(22) PCT Filed: Dec. 29, 2009

(86) PCT No.: PCT/IB2009/007908
§ 371 (c)(1),
(2), (4) Date: Aug. 16, 2011

(87) PCT Pub. No.: WO2010/076646
PCT Pub. Date: Jul. 8, 2010

(65) Prior Publication Data
US 2011/0283797 A1    Nov. 24, 2011

(30) Foreign Application Priority Data
Jan. 5, 2009    (FR) .................. 09 50012

(51) Int. Cl.
*G01N 29/04*    (2006.01)
*G01V 1/38*    (2006.01)

(52) U.S. Cl.
CPC .................. *G01V 1/3808* (2013.01)

(58) Field of Classification Search
CPC ....... G01V 1/38; G01V 1/3808; G01V 1/201; G01V 1/3835; G01V 1/3861; G01V 2210/56; G01V 1/003; G01V 1/005; G01V 1/22; G01N 29/26
USPC ......... 367/15, 21, 16, 14, 7, 141, 17, 188, 20, 367/117, 13, 131, 99; 701/21, 2; 702/14, 702/16; 114/244, 321, 333, 337; 206/305, 206/408; 254/266; 290/53; 324/337, 345, 324/365; 348/161, 81; 382/107; 405/154.1, 405/190, 211.1, 403; 62/440, 457.1; 703/6
See application file for complete search history.

(56) References Cited

U.S. PATENT DOCUMENTS

| 3,359,536 | A | 12/1967 | Coburn |
| 3,436,776 | A | 4/1969 | Davis |

(Continued)

FOREIGN PATENT DOCUMENTS

| EP | 0154968 A2 | 9/1985 |
| EP | 884607 | 12/1998 |

(Continued)

OTHER PUBLICATIONS

International Search Report issued in International Application PCT/IB2009/007908.

(Continued)

*Primary Examiner* — Luke Ratcliffe
*Assistant Examiner* — Amienatta M Ndure Jobe
(74) *Attorney, Agent, or Firm* — Norton Rose Fulbright US LLP (57) ABSTRACT

A system for aquatic seismic prospecting includes at least one submerged mobile seismic source for creating a disturbance transmitted through an aquatic medium in the form of waves and at least one cable having a plurality of sensors for collecting waves transmitted by the at least one submerged mobile seismic source and reflected from geological layers beneath the aquatic medium. The system also includes means for detecting and measuring the reflected waves and means for placing the at least one cable under tension, the tensioning means attached to ends of the at least one cable and the tensioning means keeping the at least one cable in a pseudo-stationary position. These is also means for holding the at least one cable at a substantially constant depth greater than approximately 5 meters.

10 Claims, 6 Drawing Sheets

(56) References Cited

U.S. PATENT DOCUMENTS

| | | | |
|---|---|---|---|
| 4,276,845 A * | 7/1981 | Spanner | 114/42 |
| 4,314,363 A | 2/1982 | Thigpen et al. | |
| 4,745,583 A | 5/1988 | Motal | |
| 5,144,588 A * | 9/1992 | Johnston et al. | 367/16 |
| 5,532,975 A * | 7/1996 | Elholm | 367/16 |
| 6,028,817 A | 2/2000 | Ambs | |
| 6,111,817 A * | 8/2000 | Teeter | 367/13 |
| 6,230,840 B1 * | 5/2001 | Ambs | 181/113 |
| 6,285,956 B1 | 9/2001 | Bennett et al. | |
| 6,456,565 B1 * | 9/2002 | Grall et al. | 367/18 |
| 6,474,254 B1 * | 11/2002 | Ambs et al. | 114/312 |
| 6,590,831 B1 | 7/2003 | Bennett et al. | |
| 7,112,111 B1 | 9/2006 | King | |
| 7,239,577 B2 | 7/2007 | Tenghamn et al. | |
| 7,411,863 B2 | 8/2008 | Toennessen | |
| 7,446,535 B1 * | 11/2008 | Tenghamn et al. | 324/365 |
| 8,064,286 B2 * | 11/2011 | Ronnekleiv et al. | 367/20 |
| 8,570,829 B2 * | 10/2013 | Hovland et al. | 367/16 |
| 2004/0042341 A1 * | 3/2004 | Tenghamn et al. | 367/15 |
| 2005/0128874 A1 | 6/2005 | Herkenhoff et al. | |
| 2006/0215490 A1 * | 9/2006 | Tenghamn et al. | 367/20 |
| 2007/0064528 A1 * | 3/2007 | Metzbower et al. | 367/20 |
| 2007/0070808 A1 * | 3/2007 | Ray et al. | 367/15 |
| 2007/0223306 A1 * | 9/2007 | Toennessen | G01V 1/3808 367/15 |
| 2008/0019214 A1 * | 1/2008 | Pramik | 367/16 |
| 2008/0074946 A1 * | 3/2008 | Hillesund et al. | 367/15 |
| 2009/0316526 A1 * | 12/2009 | Grall | 367/20 |
| 2010/0054079 A1 * | 3/2010 | Thompson et al. | 367/20 |
| 2011/0017118 A1 * | 1/2011 | Jean-Paul | 114/264 |
| 2011/0283797 A1 | 11/2011 | Manin | |

FOREIGN PATENT DOCUMENTS

| | | |
|---|---|---|
| EP | 1047958 | 11/2000 |
| FR | 2795527 A1 | 12/2000 |
| FR | 2870509 | 11/2005 |
| FR | 2940838 A1 | 7/2010 |
| GB | 2435931 A | 9/2007 |
| WO | WO-99/01338 | 1/1999 |
| WO | WO-00/67046 A1 | 11/2000 |
| WO | WO-2007/070499 A2 | 6/2007 |
| WO | WO-2010/076646 | 7/2010 |
| WO | WO-2011/154545 | 12/2011 |

OTHER PUBLICATIONS

PCT Written Opinion of the International Searching Authority issued Jul. 5, 2011 in International Application No. PCT/IB2009/007908.
International Preliminary Report on Patentability issued in International Application No. PCT/IB2009/007908.

* cited by examiner

ENHANCED METHOD AND DEVICE FOR AQUATIC SEISMIC PROSPECTING

This application is a national phase application under 35 USC §371 that claims priority to PCT International Application No. PCT/IB2009/007908, filed Dec. 29, 2009, which claims priority to French Patent Application No. 09-50012, filed May 1, 2009, both of which applications are hereby incorporated by reference in their entirety.

The present invention relates to a method and a device which are intended for aquatic seismic prospecting. The general principle of this type of prospecting involves putting in place a series of seismic cables, or lines, or "streamers", that are parallel and submerged, on each of which there are placed at intervals sensors such as hydrophones and/or geophones. The cables are then towed at approximately 5 knots (around 9 km/h) by one or more boats, and kept separate by divergent panels called paravanes.

According to this same principle one or more other boats, called "source", provided with means able to create a wave in the marine environment, generally in the form of an airgun, is moved at a distance from the sensor cables. The duly formed waves are propagated to the bottom of the sea, then to the different geological layers to be reflected by the latter, and are finally collected and measured by said submerged sensors.

The source boat can also be the boat pulling the seismic cables. All the information is then processed to produce a three-dimensional (3D) image of the geology of the seabed, generally used to determine the possible presence of oil reserves.

This technique has been used for very many years now and is subject to highly restrictive implementation requirements. First of all, the dynamic noise due to the towing of the cables at 5 knots disturbs the measurement of the waves that are to be collected.

Furthermore, the hydrodynamic drag resulting from the drag of the cables is very high, measured in tens of tons, for example of the order of 70 tons, which means having to use very powerful tugboats.

Furthermore, the weight and the hydrodynamic drag induced means that the cable pulling the paravanes undergoes a dynamic deformation known as the "piano wire" effect, in other words, the deformations of a wire that is made to vibrate during towing. This leads to cable fatigue and can cause it to break. This can result in extremely high replacement costs, given the immobilization of the device as a whole.

Furthermore, the cables are generally submerged at a shallow depth, between 5 and 10 m, which means they are highly sensitive to meteorological conditions, noise generated by waves and swell, and a risk of accidents due to surface maritime traffic with deep drafts, notably oil tankers, chemical tankers or container ships.

Moreover, known seismic prospecting devices leave shadow areas during measurement. In practice, the cables generally have a length of approximately 8 km and are spaced apart by approximately 100 m, which leads, for ten or so parallel cables, to a measurement area of 1×8 km.

Now, the ideal in terms of measurement is to use an isotropic system, that is to say a square surface area, for example 8×8 km. However, these dimensions are incompatible with the towing means that would be needed given the weight, the drag and the logistics needed to obtain such a measurement area. Efforts have therefore been made to remedy this situation in two ways, in a known manner.

The first attempt, known by the name of "Wide Azimuth", consists in compensating the anisotropy, by the use of one or two boats towing a set of cables, each forming a measurement area of 1×8 km, and by using 2 to 8 source boats. This system has two major drawbacks. First of all, the prohibitive cost resulting from the investment in equipment, maintenance and use, because there are 2 to 8 source boats, plus one or two tugboats, plus all the cables. The other drawback lies in the fact that the source boats each "fire" in turn, and therefore 2 to 8 times less often, which leads to a very low firing density.

The second known proposed attempt is disclosed by GB 2435931, in the name of Western Geco, which describes a method and device schematically consisting of a network of geophone sensors fixed to a two-dimensional structure taking the form of a mesh or net, or a three-dimensional structure. The structure has a periphery, called perimeter or envelope, kept in shape by dynamic means such as drones or small boats. The latter is towed continuously and one or more seismic sources are provided.

Despite the apparent attraction, theoretically, of the duly proposed device and method, this system is nevertheless impossible to implement realistically. In practice, the duly formed structure has a gigantic weight and drag and requires the use of means for keeping it in shape, that are inordinate and non-standard both technically, and in financial or budgetary terms. Furthermore, by construction it offers only a single possible geometry for the network of sensors.

According to another aspect, generally, the aim of marine seismic prospecting is to pick up or recover the maximum of signals to produce a geological map that is as precise and reliable as possible of the areas underlying the seabed. Now, the low-frequency signals provide information on very deep reservoirs and are therefore invaluable in this respect. However, the low-frequency signals are strongly attenuated by surface reflection phenomenon, called "ghost" and due notably to the fact that the cable, according to the current practice of the prior art, is submerged at only a few meters from the surface. Efforts are thus made to eliminate these "ghosts" to obtain what is called a "flat spectrum".

Attempts have been made to remedy this situation by using a technique known as "over-under", which consists in having two sensor-bearing cables, one vertically under the other, at respective depths for example of 20 m and 26 m. The processed combination of the two signals received via the two respective cables makes it possible to attenuate or even eliminate the consequences of the "ghosts". However, this known method, in addition to the additional signal processing that it requires, presents the major drawback of very greatly reducing productivity and increasing costs, because of the duplication of the cables and sensors.

Another known technique seeking to eliminate the "ghosts", proposed by the company PGS, consists in using lines or cables supporting, in addition to hydrophones that measure pressure, geophones or accelerometers able to measure the speed or acceleration of the wave.

Since the reflection coefficients for the respective pressure measurements by the hydrophones and speed measurements by the geophones are opposite, namely −1 and +1, it is thus possible in theory to cancel the "ghosts".

This known technique presents the drawbacks of requiring a high investment in sensors and generates nuisance noise picked up by the geophones or accelerometers as a resulting of the towing speed, which is approximately 5 knots, generating spurious vibrations. It would also appear that the measurements from the geophones or accelerometers used in this technique are unusable below 20 to 30 Hz.

Another known technique and implementation is OBC, standing for "Ocean Bottom Cable". These cables must be laid on the sea bottom to perform the measurements, then raised on board and towed to the next measurement station and then once again relaid. The laying requires heavy and sophisticated means such as cable-laying boats with dynamic positioning and takes a long time. Consequently, this technique is too expensive and too slow to be able to be considered sufficiently cost-effective to meet the needs of the seismic marine exploration market as a whole.

According to the document FR 2 795 527, there is disclosed a submarine seismic prospecting system, notably when the sea bottom is at a great depth. The prospecting method uses at least one measuring array, at the head of which is provided a diving vehicle and at the tail an inert float. The array is formed by a non-extendable and non-compressible internal pipe and a radially extendable external pipe coaxial to the internal pipe. Means are provided for injecting a liquid into the space between these two pipes in order to adjust the buoyancy of the hydrophone array between a negative value where it rests on the bottom of the sea and a positive value where it floats above this bottom to be able to be moved from one measurement position to another, between measurement operations. This patent therefore concerns only measurements performed when the hydrophone arrays are immobile on the bottom of the sea. In practice, taking measurements in these conditions is not always appropriate economically, without mentioning the time it takes to perform each measurement operation, between the moment when the cable is moored on the bottom of the water and then repositioned in the required place at the next measurement site. Moreover, the assembly is very heavy, as the OBC cables concerned in this patent are designed to be well attached to the bottom of the sea and thus have a significant mass in the water, namely 8 kg per sensor module, or 2560 kg for the sensors of a single cable, that is to say 1462 kg per km for the link cable, or 11 696 kg in all. The OBC cable therefore weighs 14 256 kg in the water. It is therefore necessary to displace about 14 m$^3$ of fluid to make it buoyant at a depth of 100 m, which requires an enormous energy expenditure of approximately 14 megajoules.

The document WO 00/67046 describes a method of seismic prospecting using a set of seismic cables. According to one embodiment, each of the two ends of each cable is linked to movement means in order to move the cables in order to obtain a desired configuration. However, the cables are not positioned at a predetermined depth and the measurements are performed when the assembly is moving, in the same way as if the set were being towed by a tugboat.

Compared to the foregoing, the invention proposes a method and a device for aquatic seismic prospecting that is able to resolve the problems of the prior art explained hereinabove, and that offer the following advantages, in particular:
  of being able to produce sets of cables in various geometries suited to requirements, freed of the mechanical and hydrodynamic limitatious, adapted to the requirements, notably of very wide geometries that lend themselves to the exploration of deep and complex areas;
  of obtaining signals with "flat spectrum" with a minimum noise level
  while avoiding any risk or danger resulting from surface navigation;
  of involving only movement means that are limited in power on the one hand, and reduced source boat means on the other hand;
  more economical in terms of investment, maintenance and operation.

The present invention can be used on any expanse of water, at sea or in a lake or a pond: the term "marine", when used in the current application, whether in the description, the claims or the drawings, can therefore, in the present document, be applied to expanses of water other than sea and can be considered to mean "aquatic".

To this end, according to one object of the present invention, there is proposed a method for aquatic seismic prospecting, of the type in which:
  a submerged mobile seismic source is positioned, able to create one or more disturbances transmitted through the aquatic medium in the form of waves able to be reflected on the bottom of the water and the different deep underlying geological layers;
  at least one cable, and preferably several, provided with a plurality of sensors is positioned, able to collect said reflected waves;
  said seismic source is triggered with one or more repeats thus creating one or more disturbances;
  said reflected waves are picked up using said sensors;
  the invention being more particularly defined in that:
  said at least one cable comprising sensors is set in a measurement station in a stationary or pseudo-stationary manner, either relative to the aquatic medium, or relative to the bottom of the water;
  said at least one cable is kept, on the one hand, under tension with the aid of drones attached to its two ends and, on the other hand, at a substantially constant depth during the measurement, greater than 5 m, preferably between 20 m and 200 m, and even more preferentially between 50 m and 100 m;
  the assembly, on the one hand the cable and on the other hand the seismic source, is moved to another measurement station, and so on.

It is important to note that, compared to the different methods and processes described in the prior art, the set of cables is not towed by a tugboat in the measurement operation, but is held in a stationary or pseudo-stationary position.

In a preferred embodiment, the sensors consist either of hydrophones only, or, according to a preferred embodiment, a combination of hydrophones and geophones and/or accelerometers.

According to a preferred embodiment of the invention, called "progressive shooting", the acquisition can be carried out by moving the cables between two measurement stations parallel to one another, by a distance, or pitch, of between 100 m and 600 m, preferably between 200 m and 400 m.

As an example, a number of cables, for example 5, 10 or 20, can be provided, which can be positioned parallel to one another.

The submersion depth of the parallel cables is greater than 5 m, and preferably between 20 and 200 m, and even more preferably between 50 and 100 m. The cables have a length of between 4 and 12 km, preferably between 6 and 10 km, preferably 8 km, whereas the separation between cables is between 100 and 600 m, the sensors being positioned approximately every 25 m on the cable, which gives a number of sensor modules of the order of 320 per cable, in which each module comprises a hydrophone and a geophone, or triaxial accelerometer, or 4 sensors, the total number of sensors thus being of the order of 1280. A first preferred variant configuration is to position the sensor modules every 12.5 m and thus double the number of sensors per cable. Another preferred variant of this type of configuration provides for the sensors to be distributed in clusters 25 m or 12.5 m long.

Advantageously, means are provided, such as drones or equivalent, that make it possible to:
  keep each cable under tension;
  keep each cable stationary; and
  move said cables.

The means able to keep the cables at a constant depth include ballast containers, ballasts, buoys and/or thrusters.

The parallel cables are positioned so as to represent in plan view from their perimeter, a rectangle, a circle, an oval, a diamond or a square.

A single source boat is preferably used, moved during the measurement substantially either perpendicularly or parallel to the longitudinal direction of the parallel cables.

The invention also relates to a device for aquatic seismic prospecting, of the type comprising:
at least one submerged mobile seismic source, able to create one or more disturbances transmitted through the aquatic medium in the form of waves able to be reflected on the bottom of the water and on the different underlying geological layers;
at least one cable, and preferably several, provided with a plurality of sensors, preferably of the hydrophone and geophone (or accelerometer) type, able to collect said reflected waves;
means of detecting and measuring said waves, and
means of moving said seismic source According to the invention, the device also comprises:
means of placing said at least one cable under tension, which are attached to its two ends and making it possible, on the one hand, to position, in a measurement station, said at least one cable in a stationary or "pseudo-stationary" manner, either relative to the aquatic medium or relative to the bottom of the water and on the other hand, to move said at least one cable from one measurement station to the next;
means making it possible to keep the cable at a substantially constant depth, during the measurement, greater than 5 m, preferably between 20 m and 200 m, and even more preferentially between 50 m and 100 m; and
means of triggering said source.

The means of tensioning and moving said at least one cable preferably consists of drones or any equivalent means such as small boats. Preferably, the tension applied is of the order of a few hundred Kgf, so as to maintain an approximately linear smooth cable shape.

In stationary mode relative to the marine environment, the set of cables is said to be drifting. The cables are therefore roughly stationary relative to the surrounding water. In the "pseudo-stationary" mode, the cable moves in the water against the average current to compensate its longitudinal effect within an absolute frame of reference linked to the sea bottom. The variable residual current simply has the effect of slightly moving the cable translation-wise perpendicularly to its direction within an absolute frame of reference. In the pseudo-stationary mode, the cables navigate against the mean current to partly compensate the drift effect of this mean current. There does, however, remain a residual variable current that has the effect of slightly moving the cables translation-wise without affecting seismic density.

The sensors consist of hydrophones, or even a combination of hydrophones and geophones.

The drones or equivalent means such as small boats make it possible to:
keep each cable under tension,
keep each cable stationary; and
optionally move said cables between two successive measurements stations.

According to another embodiment, the water currents are used to move the cables, the latter then drifting with the currents. Obviously, movement of the cables can be obtained by combining current drift with the pulling forces exerted by the drones.

The means able to keep the cables at a constant depth include ballast containers, ballasts, buoys and/or thrusters.

The invention will be understood in light of the following detailed description of exemplary embodiments, which although not limited hereby, with reference to the appended drawings in which.

There follows a description of the inventive device, and the method for its implementation, in a marine seismic prospecting application, it being understood that the invention equally applies to prospecting in any type of expanse of water, including, with a few adaptations, under the polar icecaps.

Figure 1:
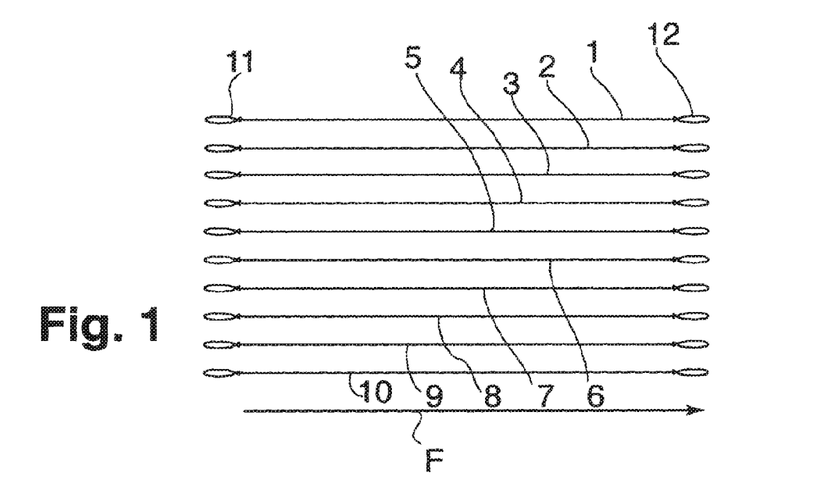
FIG. 1 shows a diagrammatic plan view of the arrangement of a line of parallel seismic cables positioned according to the invention.

Referring to FIG. 1, the inventive device, and its method of implementation, include several submerged seismic cables, also called lines or even "streamers", referenced 1 to 10, positioned parallel to one another. The cables are an adaptation of cable types that are known per se, except that their buoyancy is substantially zero and their mechanical and hydrodynamic architecture adapted to their almost zero speed in the water, involving a very low tension and very low hydrodynamic drag. Each cable supports a number of seismic sensors, such as hydrophones or even hydrophones and accelerometers.

At each of the two ends of each cable there is fixed a cable positioning and tensioning device, of the floating, submersible or semi-submersible type, and more particularly, by way of example, either a small boat, or a drone-type craft. Thus, at each of the two ends of the cable 1 there is fixed a drone, respectively 11 and 12, the pairs of drones associated with the ends of the other cables not being referenced in the interests of clarity.

The cables 1 to 10 are positioned parallel to one another in a longitudinal direction diagrammatically represented by the arrow F in FIG. 1.

The cables are independent of one another, with no mechanical link between them.

The drones are provided with independent propulsion means. Schematically expressed, the cable configuration is kept stationary or pseudo-stationary, then measurements are carried out using a single source boat, and then the cable configuration and source are moved to another measurement station.

As an example, the number of cables likely to thus be positioned is between 5 and 30, preferably between 20 and 25, whereas the length of the cables is between 6 and 12 km, and preferably of the order of 8 km.

Figure 2:
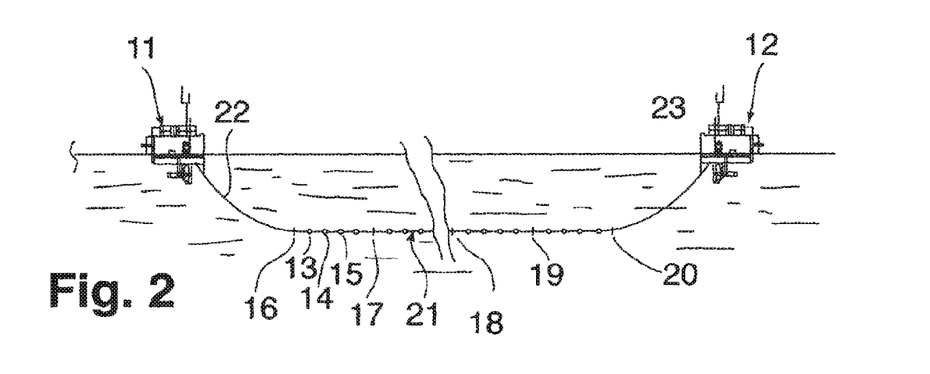
FIG. 2 is a diagrammatic view, in a vertical longitudinal plane, of a cable and its associated positioning means.

FIG. 2 shows a detail view, from the side of a vertical longitudinal plane, that is to say perpendicularly to the surface of the expanse of water, of one of the seismic cables, in this case the cable 1, and its associated drones 11 and 12.

Cable 1 has sensor modules fixed to it, of which only the first three 13, 14 and 15 are referenced, in the interests of clarity. There are, for example, 320 sensor modules spaced 25 m apart.

Cable 1 also comprises elements forming a ballast container and referenced 16 to 20, and intended to keep the cable at a constant submersion depth. Thus, the cable includes a main central portion 21 that is substantially rectilinear, supporting the sensor modules and ballast container elements, and two curved end portions 22 and 23 linking the central portion to each drone 11, 12.

The drones are of the type known per se, for example floating, or semi-submersible with propulsion, preferably diesel, or of the electrical type powered by a cable linked to an energy source on the main boat.

The drones comprise propulsion means (thruster) so as to keep the cable under tension, and more specifically so that the central portion 21, supporting the hydrophones, is:
  substantially horizontal (see FIG. 2), and
  positioned at a constant depth (using means specified later) between 20 and 200 m, preferably between 50 and 100 m.

The expression "depth of the cable" should be understood to mean the height of water situated above said rectilinear central portion 21.

The assembly formed by a cable and its sensors is designed to have a substantially zero buoyancy, that is to say that the average specific gravity of the cable is substantially equal to the specific gravity of the surrounding water, or slightly positive.

According to the invention, the cables 1 to 10 are kept:
  each under tension;
  in a given configuration; in the example of FIG. 1, the cables are parallel to one another;
  stationary, either relative to the marine bottom or relative to the marine environment, or in a "pseudo-stationary" manner, to take account of the marine currents; and
  at a given constant depth.

The drones can comprise absolute positioning means, of the GPS type. By using known triangulation means (of the acoustic type), it is possible to know the relative position of each sensor, and therefore from the GPS of the drones, the absolute position of each sensor.

Figure 3:
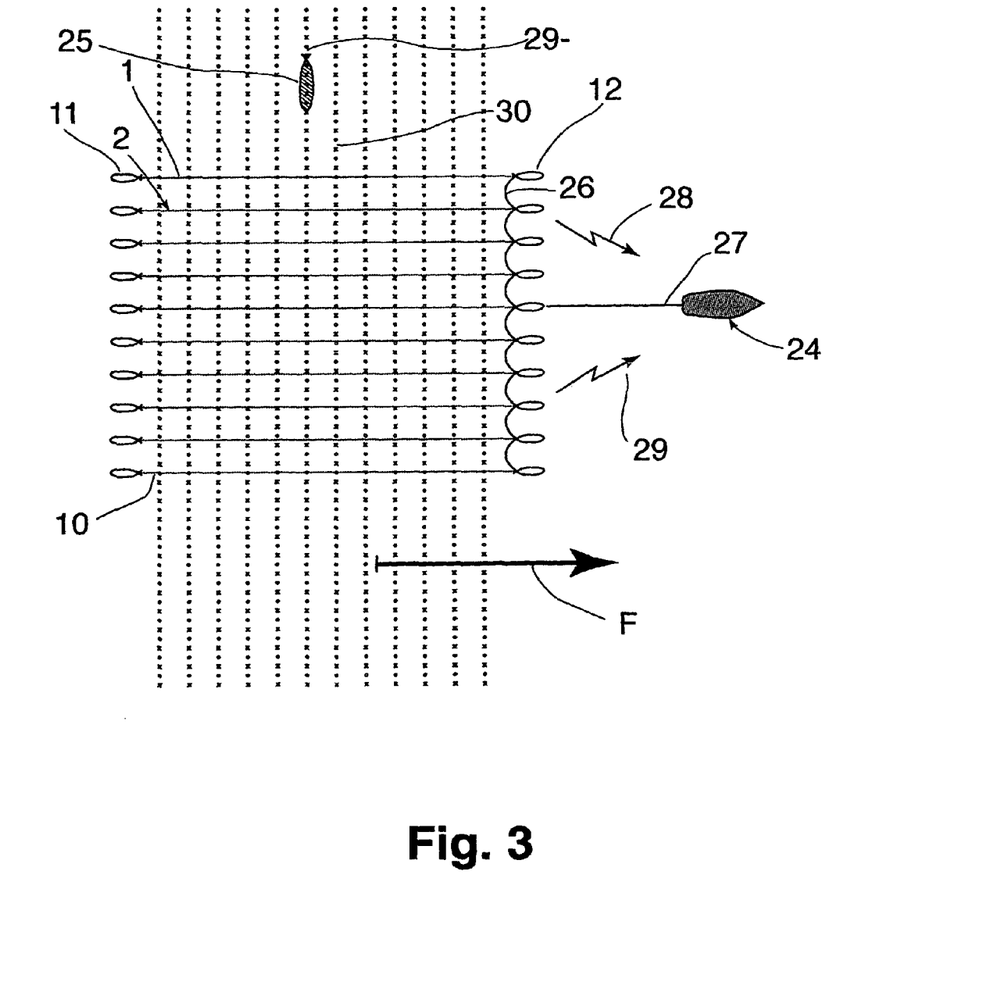
FIG. 3 is a diagrammatic plan view of the inventive device as a whole, comprising the parallel seismic cables, the boat recording the measurements and the source boat.

FIG. 3 diagrammatically represents, in plan view, the inventive device and its operation is described hereinbelow. The set of cables 1 to 10 as described previously is put in place according to a parallel cable configuration forming, for example, a square, for a measurement station. The cables are therefore parallel to one another, at a constant and equal distance of a few hundreds of meters, and are stationary, either relative to the marine bottom, or relative to the marine environment. In the latter case, they are subject only to the currents.

The assembly also comprises a main boat 24, including means of recording the signals originating from the seismic sensors, in other words hydrophones and geophones, from the position sensors, positioned on the cables and in the drones. The main boat 24 can be positioned at any point relative to the set of cables, but preferably on a longitudinal axis passing roughly through the middle of the geometrical figure, in this case a square, formed by the set of cables. This preferred position close to a drone called pilot also makes it possible to optimize the radio transmissions of the seismic data. The main boat 24 is positioned in an approximately fixed manner relative to the set of cables during the measurements, then follows the movement of this set from one measurement station to another.

Also provided is a boat 25, supporting a seismic source, of the type known per se and, for example, an airgun. The source boat 25 moves, according to the preferred embodiment of FIG. 3, offset relative to the set of cables, in a direction transversal to that of the cables. The set of cables is kept stationary for the time needed for the source boat to typically carry out a line of firings or a set of lines of firings represented in the figure by asterisks.

The main boat 24 includes means of receiving the measurements and information originating from the sensors in order to process said measurements.

The information originating from the sensors, both seismic and position sensors, is first of all stored temporarily in the drones, then transmitted in three possible ways to the main boat 24:
  either by electrical links, on the one hand by a cable and on the other by a link, such as that referenced 26 between the cables 1 and 2, and on the other hand between the cables 1 to 10 and the main boat 24 (link 27);
  or by wireless link, such as a radio or other link, symbolized by the arrows 28 and 29; in this solution, there are no wired links 26 between the seismic cables and the link 27, that is to say, between the seismic cables and the measurement boat 24;
  or by physical recovery of the disks or storage memories placed in the drones, in which case the radio link is used to transmit quality control information, position information that is small in volume, and commands in both directions.

According to a preferred embodiment, the main boat 24 can be linked to the drones by bidirectional radio links for the transmission of positioning data, seismic and control data. Each drone can thus communicate with the others, and with the source boat 25 and the main boat 24 which records the data. As an example, the source boat and the main boat can then receive in real-time positioning information concerning the cables, their sensors and the drones. The source boat can then use this information in real time to determine, based on the position of the cables, the frequency of firings from the source, the direction of the firing lines and the firing margins, relative to the real-time position of the cables. The drones can also be moved in real time according to current and/or firing conditions.

Prior to the steps of firing from the source and measurements of the reflected waves, the cables are brought into position using one or more transport boats. The cables equipped with their sensors are wound on drums. When the transport boat arrives at the first measurement position, a drone, for example an upstream drone, is placed in the water; the end of a cable is attached to this drone using an attachment previously installed on the drone and the cable is unwound. The cable can either be pulled by the upstream drone, with the transport boat remaining immobile, or unwound due to the forward movement of the transport boat, the upstream drone then being immobile; when the cable is completely unwound, its other end is attached to another drone, in this case the downstream drone. The cable with its two drones is then freed from the boat. During this manoeuvre involving placing in the water, the upstream drone can receive information from a central system, for example, located on the main boat. This information enables it to position itself, using its GPS, in a precise position. The desired depth of the cable is obtained by tensioning the cable using the drones and by acting on appropriate means such as ballast containers, buoys and/or ballasts. The same procedure is applied to the other cables, with them being positioned relative to one another so as to obtain the desired configuration, for example a square, or any other desired geometrical shape.

The following steps, according to a preferred embodiment, are:
  the configuration shown in FIG. 3 constitutes a measurement station, in which the elements of the latter, comprising the seismic cables, the source boat 25 and the measurement boat 24, are located at a given distance from one another and in a given configuration;
  with the set of seismic cables and the main boat 24 being kept stationary, the source boat 25 begins a series of "firings" by periodic triggering of the seismic source, while moving along a line 29, perpendicular to the longitudinal direction (arrow F) of the seismic cables. The distance thus travelled by the source boat 25, moving away from the stationary set of seismic cables, is of the order of 16 km, for a firing density of the order of 6 per minute, for a duration of approximately 2 hours;
  the waves collected by the cables are picked up by the sensors, then the corresponding signals are sent to the main boat 24 to be processed therein;
  then, the set is moved to another measurement station in the following manner:
    the set of seismic cables 1 to 10 is moved parallel to itself, through the intermediary of the drones and their propulsion means, by a distance for example of between 25 to 500 m, which corresponds to a "pitch" of movement between two measurement stations;
    during this time, the main boat 24 moves in the longitudinal direction (arrow F) by the same distance or the same pitch;
    also during this time, the source boat 25 returns to the set of cables to be positioned on a new offset transversal line 30, distant from the preceding line 29 by said pitch.

It will be noted that the movements of the cable or cables can take place on each firing from the source, but more often than not this will be after a succession of firings has taken place:
either a line of firings comprising, for example, 600 firings, according to a method called "progressive shooting", or even after a set of lines of firings, a blanket for example, according to a method called "patch" referring to a similar technique used in an onshore environment. In this case, the set of cables is kept stationary or pseudo-stationary for the entire time it takes for the source boat to fire a blanket or grid of firings such as those represented in FIG. 3 by the lines of asterisks. Then, the whole of the square or rectangular configuration of cables is moved longitudinally by a length of the device, or transversely by a width of the latter, and the sequence of firings is repeated in the same way.

When a cable is positioned at a measurement point, it is tensioned using the drones attached to its two ends, the drones pulling the cable in opposite directions. The traction forces exerted by the two drones of one and the same cable and are not necessarily equal in absolute value since it is necessary to fight against the current. If we consider, for a given cable, the components of the forces exerted by the drones along the longitudinal axis formed by the intersection of a vertical plane passing through the cable concerned and the horizontal plane formed by the expanse of water, the forces being counted positively in the direction of the longitudinal movement of the cable, that is to say in the downstream drone—upstream drone direction, the drone situated downstream, that is to say behind the cable in the direction of movement of the cable, exerts on the cable a force $-T_{av}$ (minimum cable tension) that is negative. The upstream drone exerts a force $T_{am}=T_{av}+F$ in which F is the hydrodynamic drag of the cable in the current. In the absence of currents, or if the cables are allowed to drift, the forces $T_{av}$ and $T_{am}$ are equal and opposite (since $F=0$).

Another variant implementation of the inventive method consists in moving the source boat 25 along a line parallel to the cables (arrow F). This variant is less preferred than that in which the source boat moves perpendicularly to the cables, which provides isotropic measurements and a smaller seismic pixel size, also called "bin", for example measuring 12.5 m×12.5 m, making the measurements more accurate.

Figure 4:
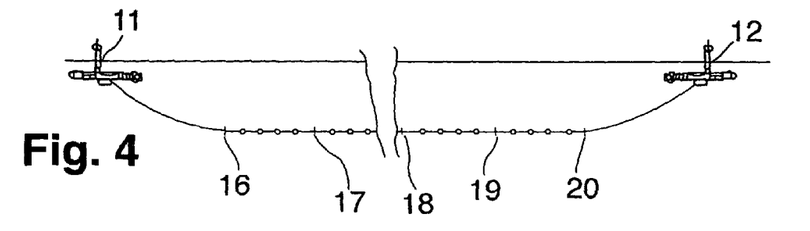
FIG. 4 is a variant of FIG. 2.

FIG. 4 shows a variant embodiment, compared to FIG. 2, of a seismic cable and its two associated drones, in the form of semi-submersible drones.

Figure 5A:
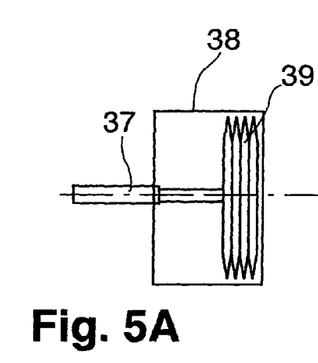
FIGS. 5A and 5B are cross-sectional detail views in a radial longitudinal plane of a first means of keeping a ballast container at a constant depth, shown in two states, respectively filled with water and empty.
Figure 5B:
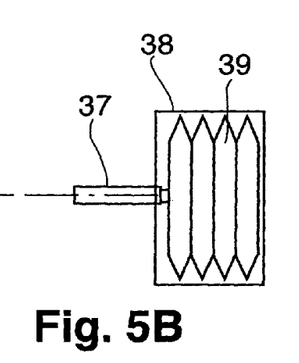

The cable is kept at a constant depth by means described hereinbelow. According to a first example, ballast containers 16 to 20 are used, one example of which is shown in FIGS. 5A and 5B according to two cross-sectional diagrammatic views of a ballast container, comprising an actuator 37, a box 38 inside which there is a bellows 39. Depending on the compressed or expanded state of the bellows, the water fills the box or is discharged from the latter.

Figure 6:
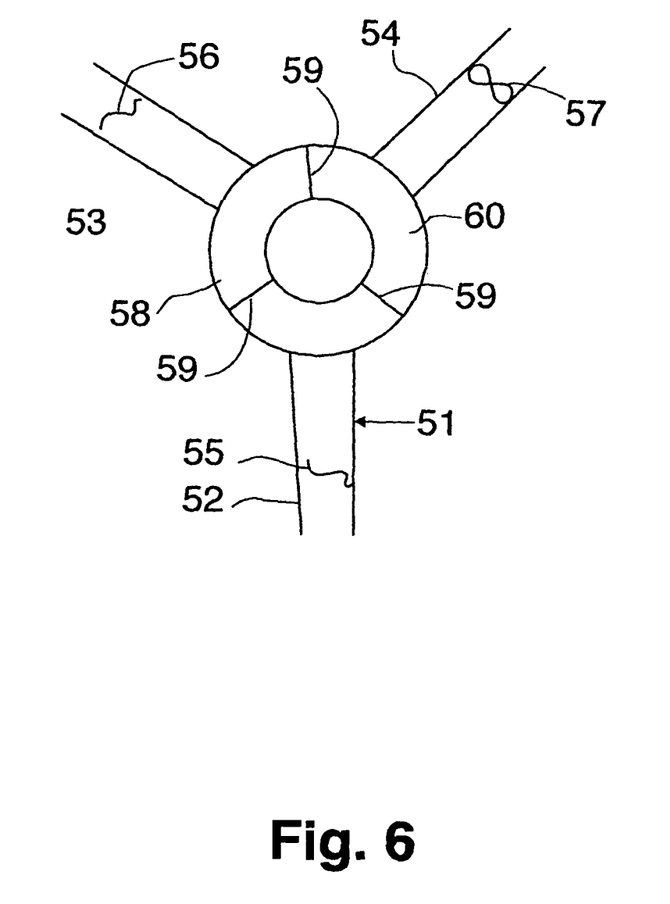
FIG. 6 shows a diagrammatic transverse cross-sectional view of a second means of keeping a cable at constant depth.

According to a second example, shown in FIG. 6, the means of keeping a cable 50 constant at a given depth include thrusters 51 of known type. Each thruster comprises three tubes 52, 53 and 54 arranged at 120° radially around the cable 50. Within each tube there is a propeller, respectively 55, 56 and 57, associated with a motor. To compensate the effects of rotation of the cable on itself, inclinometers are provided that make it possible to gain a thrust reference on the thrusters when vertical. These thrusters can also be used to keep the separation between the cables constant, compensating or assisting the drones in this respect. The cable 50 is surrounded by a frame 58 of cylindrical form, linked to the cable 50 by spacers 59. A space 60 situated between the cable 50 and the frame 58 allows water to circulate around the cable 50.

Figure 7:
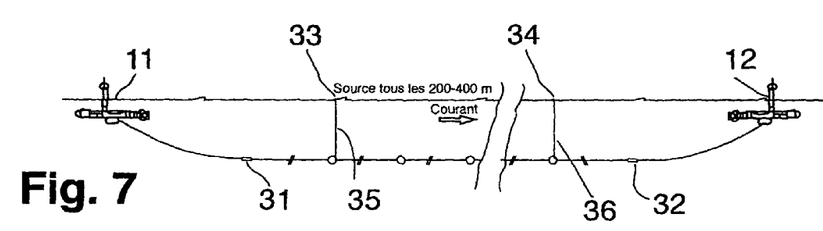
FIG. 7 shows another variant of FIGS. 2 and 4.

FIG. 7 shows yet another variant embodiment, with drones identical to those of FIG. 4, the seismic cable being associated with:
  ballasts, of which only two, referenced 31 and 32, are indicated in the figure;
  buoys, of which only two, referenced 33 and 34, are shown in the figure, positioned every 200 to 400 meters in the longitudinal direction of the seismic cable; each buoy is linked to the cable by a wired link, respectively 35 and 36.

This embodiment, as illustrated in FIG. 7, is adapted to the variant of the method in which the set of cables is kept stationary relative to the aquatic medium, that is to say, drifts according to the local current.

It is also ideal for the case where the cable is kept "pseudo-stationary" relative to the bottom. For example, for a current of 1 knot, the cables are self aligned in the direction of the current.

One of the "upstream drones", i.e. those pointing in the direction of the current, constitutes a fixed point and produces what is called a "pseudo-dynamic" positioning of the set of cables relative to a given absolute position. The "upstream drones" of the other cables are positioned according to the dual setpoint:
  upstream line of drones perpendicular to the cables (in the case of a square or rectangular configuration);
  given constant separation of the upstream drones.

The device is provided with means making it possible to retain the configuration of the cables according to the variations of the current, e.g. direction, intensity. In case of reversal of the current, the upstream and downstream drones swap their functions, and in this case in point, the drones are therefore identical in terms of their functionalities.

FIGS. 8A to 8E schematically show different link possibilities between the cable 1 and each sensor module, in order to enable the sensor modules to be mechanically separated.

Figure 8A:
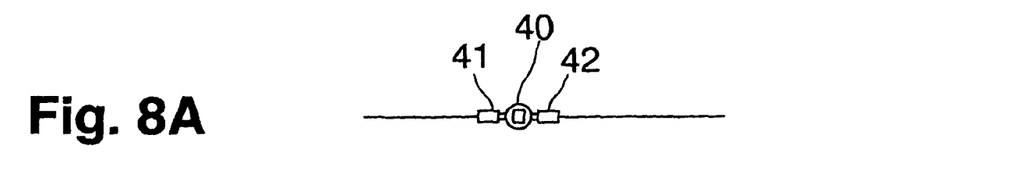
FIGS. 8A to 8E are diagrammatic representations of different variants for fixing and linking sensors to a cable.

FIG. 8A shows the box 40 comprising the sensors, and linked to the cable by right and left connectors 41 and 42; the box 40 can also be linked to the cable in a fixed manner.

Figure 8B:
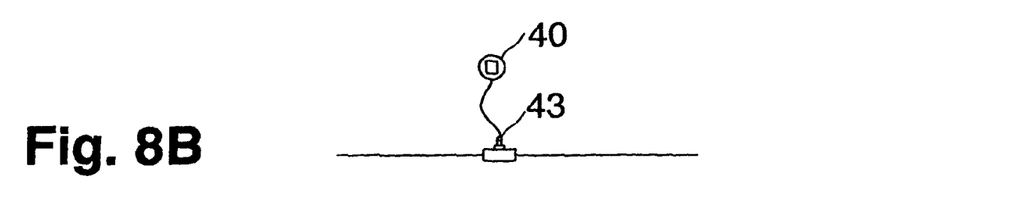
Figure 8C:
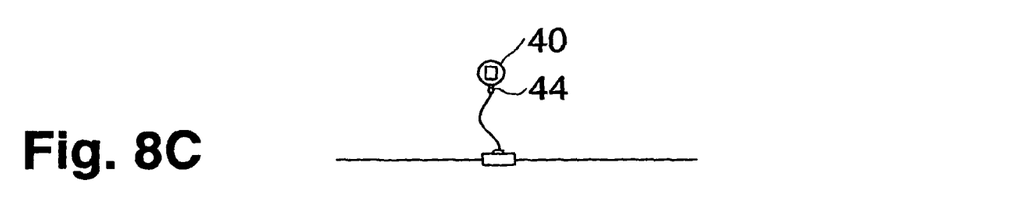

FIGS. 8B and 8C show a common variant in which the box of sensors is not fixed directly to the cable, in order to reduce the noise and avoid the possible measurement artefacts generated by the presence, and the vibrations, of the cable. The box of sensors is linked to the cable by a tap line, or "take-out", of a few meters via a connector 43 located on the cable (FIG. 8B) or by a connector 44 located on the box of sensors (FIG. 8C).

Figure 8D:
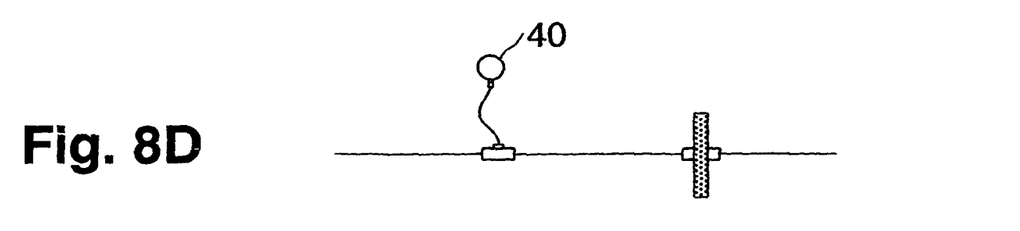

FIG. 8D shows the variant of FIG. 8C, also showing the buoy fixing system, according to the option shown in FIG. 7.

Figure 8E:
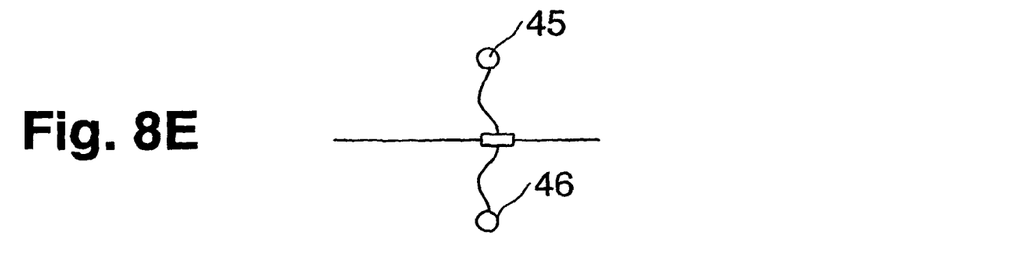

FIG. 8E shows a variant that is preferred over that of FIG. 8D, in which two sensor boxes 45 and 46, including hydrophones only, are attached to the cable by flexible links, for example approximately 3 m long, on either side of the cable, in the vertical direction.

Figure 9:
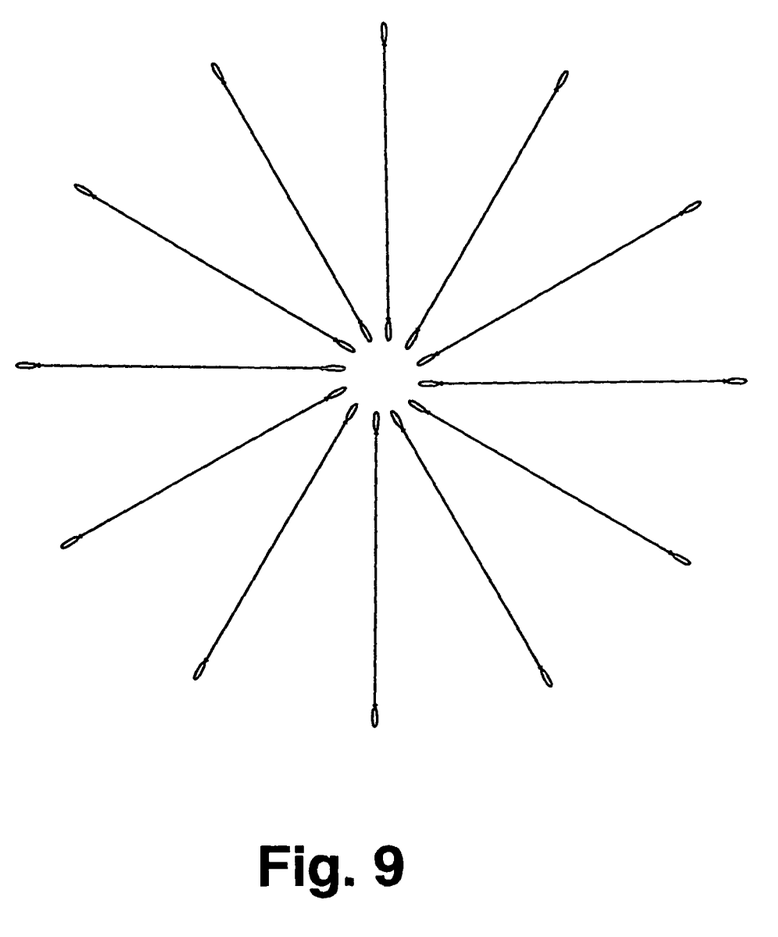
FIG. 9 shows a plan view of a variant arrangement of the seismic cables, in a star, that can be produced in stationary mode relative to the marine environment.

Finally, FIG. 9 is a diagram of another exemplary configuration of the cables, in this case a star configuration, that can be produced only in the stationary mode relative to the aquatic environment. Other configurations are possible: diamond, trapezium, rectangle, etc.

The whole of the device is preferably managed by a central logic system, such as a programmed computer, placed in the main boat and managing, for example, acquisition of the seismic data, driving of the drones for their positioning and actuation of the source. A central intelligence, in the form of real-time software, manages and coordinates the navigation commands in order to obtain the best stationarity and the desired cable geometry, throughout the series of measurements. This software can take account of the sea currents. For this, the current speed and orientation values are not only measured locally, or compiled in existing publications, but also predicted over a period of a few days, by using oceanographic and/or meteorological services, and existing models, then recorded in a database of the central computer.

The inventive method and device offer the following advantages:
using hydrophones and geophones makes it possible, by combining signals originating from the two types of sensors, to obtain a "flat spectrum", eliminate "ghosts" and collect information relating to very low frequencies and determine the direction of the waves, for example, to separate noise originating from other seismic boats;
the seismic cable is subject to a low tension compared to the tension of the prior art in which the cable is towed at a speed of several knots; consequently, the noise level due to towing is greatly reduced, notably for the geophones and the accelerometers;
in the variant in which the cable is stationary relative to the aquatic bottom, it is moved at a speed that is the inverse of that of the current, of the order of 1 knot on average, that remains low compared to the speeds of movement of the conventional methods. The flow noise that affects all the seismic sensors is therefore considerably reduced, or even zero in the absence of currents. Furthermore, when the cable is submerged at a great depth, for example greater than 50 m, this arrangement makes it possible to greatly reduce the noise levels, by approximately a half or a quarter, compared to the methods of the prior art, in which the cable is pulled at a speed of 5 knots, and at a shallow depth of the order of 6 m. The inventive method means that the signal is almost insensitive to the noise of the waves and the condition of the sea;
since the signal/noise ratio is significantly enhanced, the inventive device requires only a single source that is two to four times less powerful than that used normally, with the resulting savings;
the inventive device allows for a wide variety of geometrical cable configurations, notably very wide configurations, called "wide azimuth", or very long configurations, as indicated previously. It is thus possible to adapt the configuration to the type of prospecting carried out, and more specifically to the complex and deep geological structures being investigated, such as, for example, salt domes, faults, overlaps and basaltic layers;
this same configuration versatility enables the inventive device to circumvent obstacles, such as small islands or oil platforms, while continuing with the measurement. In practice, assuming a "square" configuration, it is possible to envisage separating the cables into two sets, one portion passing to the left of the obstacle, while the other portion passes to the right;
the invention allows for accurate measurements thanks to the reduced size and the isotropy of the "bin" or seismic pixel, of the order of 12.5 m×12.5 m, which makes it possible to improve the effectiveness of the seismic processing and notably the application, for example, of anti-multiples or anti-noises or imaging;
the inventive method requires only one measurement boat of reduced power compared to the prior art, since the latter does not tow the set of cables;
the inventive device involves only a single source boat; however, it is possible to make use of techniques known as simultaneous firings that can be used with airguns, or with vibratory marine sources, and thus by using several source boats, productivity then being that much more improved;
it can be estimated that the cost of using the inventive device is of the order of 35% less than the "wide azimuth" techniques described previously, and that the productivity is multiplied by a factor of 2 to 4 compared to the seabed cable laying techniques.

The invention claimed is:
1. A system for aquatic seismic prospecting, comprising:
at least one submerged mobile seismic source for creating a disturbance transmitted through an aquatic medium in the form of waves;
at least one cable of substantially zero buoyancy having a plurality of sensors for collecting waves reflected from geological layers beneath the aquatic medium;
the plurality of sensors for detecting and measuring the reflected waves, the at least one cable having a first end and a second end;
a drone is attached to each end of one cable of the at least one cable for placing the one cable under tension, wherein the pair of drones keep the one cable in a stationary or pseudo-stationary position; and
a device selected from the group consisting of ballast containers, ballasts, buoys and thrusters for holding the at least one cable at a substantially constant depth greater than approximately 5 meters and less than 200 meters.
2. The apparatus of claim 1, in which at least one of the plurality of sensors is integrated in the at least one cable.

3. The apparatus of claim 1, in which at least one of the plurality of sensors is linked to the at least one cable by flexible links.

4. The apparatus of claim 1, in which the at least one cable comprises at least five cables.

5. The apparatus of claim 1, in which the drones include a wireless transmitter communicating with the plurality of sensors.

6. A method, comprising the steps of:
- activating a seismic source in a plurality of locations in an aquatic medium;
- acquiring seismic data through a plurality of seismic sensors coupled to at least one cable having substantially zero buoyancy during the acquisition of the seismic data; and
- positioning and maintaining the at least one cable at a substantially constant depth of greater than 5 meters and less than 200 meters during activation of the seismic source at a first measurement position in at least a stationary or pseudo-stationary manner by exerting tension at each end of the at least one cable; and
- moving the at least one cable having substantially zero buoyance to a second measurement position for acquiring seismic data.

7. The method of claim 6, further comprising maintaining a plurality of cables in parallel, each of the plurality of cables coupled to seismic sensors.

8. The method of claim 6, in which the plurality of locations are aligned perpendicular to a longitudinal direction of the at least one cable.

9. The method of claim 6, in which the plurality of locations are aligned parallel to a longitudinal direction of the at least one cable.

10. The apparatus of claim 1, in which the plurality of sensors are selected from the group consisting of hydrophones, geophones, accelerometers and combinations thereof.

* * * * *